(12) United States Patent
Sasaki et al.

(10) Patent No.: US 8,999,251 B2
(45) Date of Patent: Apr. 7, 2015

(54) INORGANIC FIBER FORMED ARTICLE AND METHOD FOR PRODUCING THE SAME

(75) Inventors: Toshiaki Sasaki, Niigata (JP);
Tomoyuki Kobayashi, Niigata (JP);
Hisashi Aoyagi, Niigata (JP)

(73) Assignee: Mitsubishi Plastics, Inc., Tokyo (JP)

( * ) Notice: Subject to any disclaimer, the term of this patent is extended or adjusted under 35 U.S.C. 154(b) by 336 days.

(21) Appl. No.: 13/508,220

(22) PCT Filed: Nov. 4, 2010

(86) PCT No.: PCT/JP2010/069553
§ 371 (c)(1),
(2), (4) Date: May 4, 2012

(87) PCT Pub. No.: WO2011/055736
PCT Pub. Date: May 12, 2011

(65) Prior Publication Data
US 2012/0219464 A1    Aug. 30, 2012

(30) Foreign Application Priority Data

Nov. 6, 2009    (JP) ................................. 2009-255114

(51) Int. Cl.
*B01D 50/00*    (2006.01)
*D01F 9/08*     (2006.01)
(Continued)

(52) U.S. Cl.
CPC ................ *D01F 9/08* (2013.01); *D04H 1/4209* (2013.01); *D04H 1/46* (2013.01); *F01N 3/2853* (2013.01); *F01N 2310/14* (2013.01)

(58) Field of Classification Search
USPC ..................................... 422/179, 177; 55/523
See application file for complete search history.

(56) References Cited

U.S. PATENT DOCUMENTS

| 4,752,515 A | 6/1988 | Hosoi et al. |
| 6,602,369 B2 | 8/2003 | Shoji et al. |

(Continued)

FOREIGN PATENT DOCUMENTS

| EP | 1 267 048 A1 | 12/2002 |
| EP | 2 113 642 A1 | 11/2009 |

(Continued)

OTHER PUBLICATIONS

Combined Taiwanese Office Action and Search Report issued Apr. 10, 2014 in Patent Application No. 099138099 with English Translation of Category of Cited Documents.

(Continued)

*Primary Examiner* — Tom Duong
(74) *Attorney, Agent, or Firm* — Oblon, McClelland, Maier & Neustadt, L.L.P.

(57) ABSTRACT

Inorganic fiber formed articles containing a mat-like aggregate of inorganic fibers, the articles obtained by a needling treatment wherein a needling density per unit area of a surface of a mat exceeds 50 punches/cm$^2$, where:

i) a ratio of a number $N_A$ of fiber bundles extending in a thickness direction and located in a region with a predetermined width W of section A in a predetermined direction, to a number $N_B$ of fiber bundles extending in the thickness direction and located in a region with a predetermined width W of section B in a direction orthogonal to the predetermined direction, $N_A/N_B$, is 0.5 or less;
ii) a width of each of fiber bundle in sections A and B in the thickness direction is 0.3 mm or less; and
iii) a needle mark is present in any 3 mm×3 mm region on the surface of the mat.

17 Claims, 1 Drawing Sheet

(51) Int. Cl.
  *D04H 1/4209* (2012.01)
  *D04H 1/46* (2012.01)
  *F01N 3/28* (2006.01)

(56) References Cited

U.S. PATENT DOCUMENTS

| | | | |
|---|---|---|---|
| 7,101,613 | B2 | 9/2006 | Shoji et al. |
| 2003/0185725 | A1* | 10/2003 | Mutou et al. ............... 422/179 |
| 2004/0052694 | A1* | 3/2004 | Nishikawa et al. ........... 422/177 |

FOREIGN PATENT DOCUMENTS

| | | | |
|---|---|---|---|
| GB | 2 122 537 | A | 1/1984 |
| JP | 52-148274 | A | 12/1977 |
| JP | 7-286514 | A | 10/1995 |
| JP | 8 174687 | | 7/1996 |
| JP | 9 217258 | | 8/1997 |
| JP | 9-217258 | A | 8/1997 |
| JP | 2000 80547 | | 3/2000 |
| JP | 2000-80547 | A | 3/2000 |
| JP | 2005-120560 | A | 5/2005 |
| JP | 2006-207393 | A | 8/2006 |
| JP | 2007-162583 | A | 6/2007 |
| JP | 2009-85091 | A | 4/2009 |
| WO | WO 94/16134 | A1 | 7/1994 |

OTHER PUBLICATIONS

Office Action issued Oct. 22, 2013, in Japanese Patent Application No. 2009-255114.
Extended European Search Report issued Apr. 2, 2013 in Patent Application No. 10828296.3.
Office Action issued Nov. 28, 2013 in European Patent Application No. 10828296.3.
Third Party's Opinion issued Dec. 3, 2013 in European Patent Application No. 10828296.3.
International Search Report Issued Jan. 18, 2011 in PCT/JP10/069553 Filed Nov. 4, 2010.
Office Action and Search Report issued on Mar. 3, 2014 in the corresponding Chinese Patent Application No. 201080049211.4 (with partial English Translation).

* cited by examiner

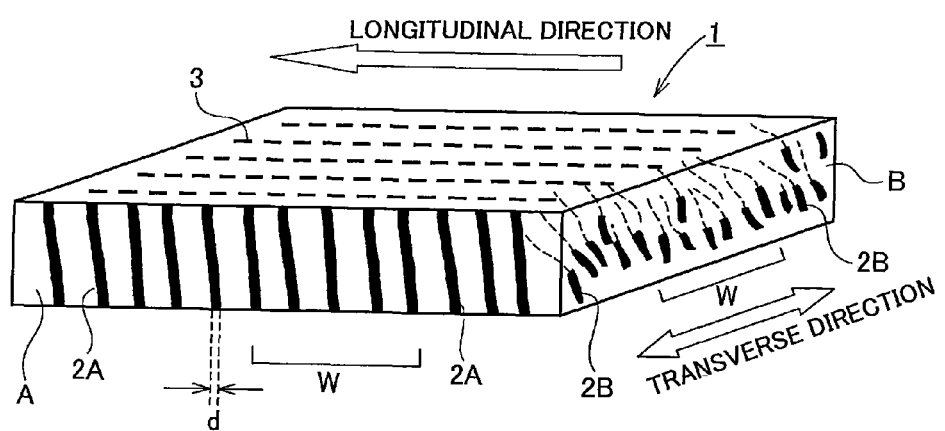

INORGANIC FIBER FORMED ARTICLE AND METHOD FOR PRODUCING THE SAME

CROSS REFERENCE TO RELATED APPLICATION

This application is a 371 of PCT/JP2010/069553, filed on Nov. 4, 2010.

FIELD OF INVENTION

The present invention relates to a mat for exhaust gas cleaning, i.e., the present invention relates to an inorganic fiber formed article useful as a holding material for use in a catalyst-supporting member used in an exhaust gas cleaning device, and to a method for producing the inorganic fiber formed article.

The present invention also relates to a mat for exhaust gas cleaning, the mat including the inorganic fiber formed article, and to an exhaust gas cleaning device.

BACKGROUND OF INVENTION

Formed articles of inorganic fibers typified by ceramic fibers have been used for applications exposed to high temperatures, for example, industrial heat insulators, refractory materials, and packing materials. In recent years, such formed articles have also been used as cushioning materials (catalyst-holding material) for automotive exhaust gas cleaning devices. That is, such formed articles have also been used as mats for exhaust gas cleaning, in which mats are wound around catalyst-supporting members and arranged between catalyst-supporting members and metal casings when catalyst-supporting members are accommodated in metal casings.

For example, in the case where such an inorganic fiber formed article is processed as a heat insulator or processed into an automotive catalyst-holding material (mat), needling treatment (needle punching treatment) is commonly performed in order to control the thickness and the surface density.

Furthermore, in order to prevent the scattering of fibers during an assembling operation, an organic binder is commonly incorporated into such a mat (Patent Document 1).

However, in a conventional inorganic fiber formed article, when the thickness is ensured, the surface smoothness is not ensured. Furthermore, for example, a phenomenon occurs in which a surface layer is peeled. This leads to problems, such as the occurrence of a partial density difference and the deterioration of workability, when the article is shaped as a heat insulator.

Moreover, an organic binder-containing mat has the following problems: The presence of the organic compound increases harmful gases due to exhaust heat generated during engine combustion. Furthermore, the mat surface pressure is temporarily reduced, i.e., the holding force is reduced, until the decomposition of the organic compound is completed.

With respect to a method for overcoming the problems, it is reported that a mat has a minimized organic binder content or is free from an organic binder. A mat that does not contain an organic binder is bulky, so it is difficult to reduce the thickness. Thus, when the mat is fitted into a metal casing, the mat can be delaminated. Furthermore, the absence of an organic binder disadvantageously causes the emission of a large amount of fibrous dust from the mat when the mat is wound around a catalyst-supporting member or fitted into the metal casing, thereby significantly deteriorating the workability.

CITATION LIST

Patent Document

Patent Document 1: Japanese Patent Publication 8-174687 A

OBJECT AND SUMMARY OF INVENTION

In consideration of the foregoing problems, it is an object of the present invention to provide an inorganic fiber formed article in which the thickness and the surface density can be easily controlled and which has excellent workability and handleability and prevents the deterioration of the work environment when the inorganic fiber formed article is processed for applications, e.g., a heat insulator or a mat.

It is another object of the present invention to provide a method for producing the inorganic fiber formed article, a mat for exhaust gas cleaning, the mat including the inorganic fiber formed article, and an exhaust gas cleaning device.

The inventors have conducted intensive studies in order to solve the foregoing problems and have found the following: By an increase in needling density during needling treatment for a mat-like aggregate of inorganic fibers, fiber bundles or needle marks are formed under predetermined conditions by the needling treatment. In this case, it is possible to provide a mat for exhaust gas cleaning, in which the thickness and the surface density of the mat are easily controlled, and the mat reveals only a small amount of dust emission and has high peel strength, excellent surface smoothness, and excellent handleability and workability when wound around a catalyst-supporting member and fitted into a metal casing.

These findings have led to the completion of the present invention. The gist of the present invention is described below.

[1] An inorganic fiber formed article includes a mat-like aggregate of inorganic fibers, the inorganic fiber formed article being subjected to needling treatment, in which the needling density per unit area of a surface of the mat exceeds 50 punches/cm$^2$, and one or more of requirements i) to iii) is satisfied:

i) the ratio of the number $N_A$ of fiber bundles extending in the thickness direction and being observed in a region with a predetermined width W of section A in a predetermined direction to the number $N_B$ of fiber bundles extending in the thickness direction and being observed in a region with a predetermined width W of section B in a direction orthogonal to the predetermined direction, i.e., $N_A/N_B$, is 0.5 or less;

ii) the width of each of the fiber bundles observed in the sections in the thickness direction is 0.3 mm or less; and iii) a needle mark is present in any of regions each having an area of 3 mm×3 mm on the surface of the mat.

[2] In the inorganic fiber formed article described in item [1], the peel strength is 5 N or more.

[3] In the inorganic fiber formed article described in item [1] or [2], the amount of dust emission is 0.1% by weight or less.

[4] In the inorganic fiber formed article described in any one of items [1] to [3], the inorganic fiber formed article has smoothness in which the peak-to-valley height difference on the same surface of the mat and the peak-to-valley height difference between front and back surfaces are each a maximum of 1 mm or less.

[5] In the inorganic fiber formed article described in any one of items [1] to [4], the inorganic fibers are alumina/silica-based fibers.

[6] In the inorganic fiber formed article described in any one of items [1] to [5], the inorganic fiber formed article is formed by subjecting a mat-like aggregate of an inorganic fiber precursor to the needling treatment and then firing the needled aggregate, the inorganic fiber precursor being prepared by a sol-gel method.

[7] A mat includes the inorganic fiber formed article described in any one of items [1] to [6].

[8] In the mat described in [7], the mat has an organic binder content of less than 2% by weight.

[9] In the mat described in [7], the mat does not contain an organic binder.

[10] In the mat described in any one of items [7] to [9], the mat is a mat for use in an exhaust gas cleaning device.

[11] An exhaust gas cleaning device includes a catalyst-supporting member, a casing that covers the outside of the catalyst-supporting member, and a mat arranged between the catalyst-supporting member and the casing, in which the mat is the mat described in item [10].

[12] A method for producing the inorganic fiber formed article according to any one of items [1] to [6] includes the steps of forming the mat-like aggregate of an inorganic fiber precursor by a sol-gel method and subjecting the resulting mat-like aggregate of the inorganic fiber precursor to the needling treatment.

Advantageous Effects of Invention

According to the present invention, there is provided an inorganic fiber formed article having high peel strength, revealing only a small amount of dust emission, and having excellent surface smoothness. Furthermore, in applications, such as a mat for exhaust gas cleaning, the inorganic fiber formed article has excellent handleability and workability, in which the thickness and the surface density can be easily limited.

A mat for exhaust gas cleaning, the mat including the inorganic fiber formed article of the present invention, can tightly hold a catalyst-supporting member without causing problems of dust emission or the delamination of the mat, thus providing a high-performance exhaust gas cleaning device.

BRIEF DESCRIPTION OF DRAWINGS

FIG. 1 is a schematic perspective view illustrating sections of an inorganic fiber formed article according to an embodiment of the present invention.

DESCRIPTION OF EMBODIMENTS

Embodiments of the present invention will be described in detail below.

[Inorganic Fiber Formed Article]

An inorganic fiber formed article of the present invention includes a mat-like aggregate of inorganic fibers, the inorganic fiber formed article being subjected to needling treatment, in which the needling density per unit area of a surface of the mat exceeds 50 punches/cm$^2$. Furthermore, fiber bundles extending in the thickness direction of the inorganic fiber formed article or needle marks, the fiber bundles and the needle marks being made by the needling treatment, satisfy one or more of, preferably two or more of, and more preferably all of requirements i) to iii) described below. Moreover, the inorganic fiber formed article preferably has a peel strength of 5 N or more, an amount of dust emission of 0.1% by weight or less, and smoothness such that a peak-to-valley height difference on the same surface and a peak-to-valley height difference between front and back surfaces are each a maximum of 1 mm or less.

i) The ratio of the number $N_A$ of fiber bundles extending in the thickness direction and being observed in a region with a predetermined width W of section A in a predetermined direction to the number $N_B$ of fiber bundles extending in the thickness direction and being are observed in a region with a predetermined width W of section B in a direction orthogonal to the predetermined direction, i.e., $N_A/N_B$, is 0.5 or less.

ii) The width of each of the fiber bundles observed in the sections in the thickness direction is 0.3 mm or less.

iii) A needle mark is present in any of regions each having an area of 3 mm×3 mm on the surface of the mat.

As illustrated in FIG. 1 which is a schematic perspective view illustrating sections of an inorganic fiber formed article according to an embodiment of the present invention, the $N_A/N_B$ ratio described in item i) is the ratio of the number $N_A$ of fiber bundles 2A extending in the thickness direction and being observed in a region with a predetermined width W of section A in a predetermined direction of an inorganic fiber mat-like formed article 1 to the number $N_B$ of fiber bundles 2B extending in the thickness direction and being observed in a region with a predetermined width W of section B in a direction orthogonal to the predetermined direction, i.e., $N_A/N_B$. The fiber bundles are formed as follows: inorganic fibers (precursor of the inorganic fibers) are bundled by the effect of needles during needling treatment in such a manner that the fiber bundles are oriented in the thickness direction of the inorganic fiber formed article. Here, the term "section A in the predetermined direction" usually indicates a section in the thickness direction and in a feed direction (hereinafter, the feed direction is also referred to as a "longitudinal direction") when an inorganic fiber mat-like aggregate is produced by a method for producing an inorganic fiber formed article according to the present invention. The term "section B in a direction orthogonal to the predetermined direction" indicates a section in the thickness direction and in a direction (hereinafter, also referred to as a "transverse direction") orthogonal to the feed direction. In examples described below, W=20 mm.

The width of each of the fiber bundles described in item ii) indicates the width of each of the fiber bundles observed in the sections in the thickness direction of the inorganic fiber mat-like formed article 1 and usually indicates the width of each of the fiber bundles 2A observed in section A in the longitudinal direction.

In the present invention, the needling density per unit area of a surface of the mat of the inorganic fiber formed article, the $N_A/N_B$ ratio described in item i), the width of each of the fiber bundles described in item ii), the needle mark described in item iii), the peel strength, the amount of dust emission, the peak-to-valley height difference on the same surface, and the peak-to-valley height difference between front and back surfaces are measured by methods described in examples below.

<Inorganic Fibers>

Examples of the inorganic fibers included in the inorganic fiber formed article of the present invention include, but are not particularly limited to, single-component fibers and composite fibers composed of, for example, silica, alumina/silica, zirconia containing them, spinel, and titania. Alumina/silica-based fibers are preferred, and crystalline alumina/silica-based fibers are particularly preferred.

The composition ratio (by weight) of alumina/silica of the alumina/silica-based fibers is preferably in the range of 60 to 95/40 to 5 and more preferably 70 to 74/30 to 26.

The inorganic fibers according to the present invention preferably have an average fiber diameter of 3 to 8 μm and particularly preferably 5 to 6 μm. An excessively large average fiber diameter of the inorganic fibers results in the elimination of the elasticity of the fiber aggregate. An excessively small average fiber diameter results in an increase in the amount of dust emitted into the air.

The average fiber diameter of the inorganic fibers is measured by a method described in examples below.

<Needling Density>

The needling density per unit area of a surface of the mat of the inorganic fiber formed article of the present invention exceeds 50 punches/cm$^2$ and preferably 80 punches/cm$^2$ or more. An increase in needling density provides the inorganic fiber formed article having higher peel strength and excellent smoothness in which the peak-to-valley height difference on the same surface and the peak-to-valley height difference between front and back surfaces are small. A needling density of 50 punches/cm$^2$ or less leads to insufficient peel strength and an insufficient effect of improving the surface smoothness. A higher needling density is more preferred in view of the peel strength, the amount of dust emission, and the surface smoothness of the inorganic fiber formed article. An excessively high needling density can damage the fibers to increase the amount of dust emission. Thus, the needling density is usually 250 punches/cm$^2$ or less and preferably 200 punches/cm$^2$ or less.

The needling density of the inorganic fiber formed article can be adjusted by performing needle-punching in such a manner that the foregoing needling density is obtained in the needling treatment in a method for producing an inorganic fiber formed article according to the present invention described below.

<$N_A/N_B$ Ratio>

In the inorganic fiber formed article of the present invention, the $N_A/N_B$ ratio is usually 0.5 or less. The $N_A/N_B$ ratio indicates that the needling density in the longitudinal direction of the inorganic fiber mat-like formed article is ½ or less of the needling density in the transverse direction. In the case where the $N_A/N_B$ ratio is 0.5 or less, the fiber bundles extending in the thickness direction are densely arranged in the transverse direction, thus achieving higher peel strength.

The $N_A/N_B$ ratio is more preferably 0.4 or less. However, an excessively low $N_A/N_B$ ratio results in an increase in irregularities in the longitudinal direction to reduce the surface smoothness. Thus, the $N_A/N_B$ ratio is usually 0.2 or more and preferably 0.3 or more.

The $N_A/N_B$ ratio can be adjusted by changing the feed rate of the precursor and the density and pattern of needles arranged in a method for producing an inorganic fiber formed article according to the present invention described below.

<Width of Fiber Bundle>

In the inorganic fiber formed article of the present invention, each of the foregoing fiber bundles usually has a width of 0.3 mm or less. Such a small width of each of the fiber bundles results in the formed article having a small amount of dust emission and high surface smoothness. Each of the fiber bundles more preferably has a width of 0.25 mm or less.

However, an excessively small width of each of the fiber bundles results in a reduction in the force of the fiber bundles on the entire fiber aggregate, thus failing to control the thickness to a predetermined value. Thus, the width is usually 0.1 mm or more and preferably 0.15 mm or more.

The width of each of the fiber bundles can be adjusted by changing the thickness of needles for use in needling in a method for producing an inorganic fiber formed article according to the present invention described below.

<Needle Mark>

In the inorganic fiber formed article of the present invention, a needle mark is usually present in any of regions each having an area of 3 mm×3 mm on a surface of the mat.

As described above, the needle marks are densely distributed. This results in the formed article having a uniform thickness across the entire surface, satisfactory smoothness, a small nonuniformity, and high peel strength.

<Peel Strength>

The inorganic fiber formed article of the present invention preferably has a peel strength of 5 N or more and particularly preferably 7 N or more. The reason for this is that when the article is processed as a heat insulator, a reduction in workability during the formation is inhibited, and the difference in density distribution is minimized. Another reason is that when the article in the form of a mat is wound around a catalyst-supporting member and assembled in a metal casing, the interlayer displacement of the mat does not occur. A higher peel strength of the inorganic fiber formed article is advantageous. The upper limit thereof is usually 20 N.

The peel strength of the inorganic fiber formed article can be increased by increasing the needling density, as described above, and adjusting the thickness of the needles and the pattern.

<Amount of Dust Emission>

For the inorganic fiber formed article of the present invention, in order to suppress the problem of the emission of dust during handling without using an organic binder or with only a very small amount of an organic binder, the amount of dust emission is preferably 0.1% by weight and particularly preferably 0.07% by weight. Usually, a smaller amount of dust emission is more preferred.

The amount of dust emission can be reduced by adjusting the needling density, the thickness of the needles, and the pattern of the needles arranged.

<Peak-to-Valley Height Difference>

In the case of a large peak-to-valley height difference on the same surface and a large peak-to-valley height difference between front and back surfaces of the inorganic fiber formed article, for example, when the articles are stacked as a heat insulator, the layers disadvantageously have different densities, and it is disadvantageously difficult to stack the articles. Furthermore, when the article in the form of a mat is wound around a catalyst-supporting member, the gap between the catalyst-supporting member and the mat is increased, thereby degrading the gas sealing performance. Moreover, when the mat is assembled in a metal casing, the friction between the metal casing and protruding portions of the mat can be increased to cause delamination of the surface layer of the protruding portions.

To suppress these problems, the inorganic fiber formed article of the present invention preferably has smoothness in which a peak-to-valley height difference on the same surface and a peak-to-valley height difference between front and back surfaces are each a maximum of 1 mm or less. Each of the peak-to-valley height differences is more preferably 0.7 mm or less. A smaller peak-to-valley height difference is more preferred. The lower limit is usually about 0.1 mm.

Such smoothness can be achieved by needling treatment at a high needling density.

The peak-to-valley height difference can be measured with, for example, a laser thickness gage, a dial gage, or a profilometer. In the present invention, a roller probe was used as described below, and the peak-to-valley height difference was determined from the locus of the probe.

<Thickness and Surface Density>

The thickness and the surface density of the inorganic fiber formed article of the present invention are not particularly limited and are appropriately determined, depending on the application. The thickness is usually in the range of about 3 to about 30 mm. The surface density is usually in the range of about 400 to about 3000 g/cm$^2$.

The thickness and the surface density of the inorganic fiber formed article of the present invention can be easily limited by the thickness of a precursor fiber aggregate prepared by a sol-gel method and needling conditions.

[Method for Producing Inorganic Fiber Formed Article]

A method for producing an inorganic fiber formed article according to the present invention is not particularly limited. Usually, the inorganic fiber formed article is produced by a method for producing an inorganic fiber formed article according to the present invention, the method including a step of forming the mat-like aggregate of an inorganic fiber precursor by a sol-gel method and a step of subjecting the resulting mat-like aggregate of the inorganic fiber precursor to needling treatment at a needling density exceeding 50 punches per unit area (cm$^2$) of a surface of the mat. In this method, after the needling treatment, a step of firing the needled mat-like aggregate of the inorganic fiber precursor to form an inorganic fiber mat-like aggregate is performed.

While the method for producing an inorganic fiber formed article according to the present invention will be described below by exemplifying a method for producing an alumina/silica-based fiber formed article, the inorganic fiber formed article of the present invention is not limited to the alumina/silica-based fiber formed article. As described above, the formed article may be composed of silica, zirconia, spinel, titania, or composite fibers thereof.

{Spinning Step}

To produce a mat-like aggregate of alumina/silica-based fibers by a sol-gel method, fibers are spun from a spinning solution containing basic aluminum chloride, a silicon compound, an organic polymer serving as a thickener, and water by a blowing method into an alumina/silica fiber precursor aggregate.

<Preparation of Spinning Solution>

Basic aluminum chloride Al(OH)$_{3-x}$Cl$_x$ can be prepared by, for example, dissolving metal aluminum in hydrochloric acid or an aqueous solution of aluminum chloride. In the chemical formula described above, the value of x is usually in the range of 0.45 to 0.54 and preferably 0.5 to 0.53. A As the silicon compound, a silica sol is preferably used. Alternatively, tetraethyl silicate or a water-soluble silicon compound, such as a water-soluble siloxane derivative, may be used. As the organic polymer, for example, a water-soluble polymer, e.g., polyvinyl alcohol, polyethylene glycol, or polyacrylamide, is preferably used. They usually have a degree of polymerization of 1000 to 3000.

With respect to the spinning solution, the ratio of aluminum originating from basic aluminum chloride to silicon originating from the silicon compound is usually 99:1 to 65:35 and preferably 99:1 to 70:30 in terms of Al$_2$O$_3$ and SiO$_2$ on a weight basis, the aluminum concentration is preferably in the range of 170 to 210 g/L, and the organic polymer concentration is preferably in the range of 20 to 50 g/L.

In the case where the amount of the silicon compound in the spinning solution is smaller than the range described above, alumina constituting short fibers is easily converted into α-alumina, and an increase in the size of alumina particles causes the short fibers to be easily embrittled. Meanwhile, in the case where the amount of the silicon compound in the spinning solution is larger than the range described above, the amount of silica (SiO$_2$) formed together with mullite (3Al$_2$O$_3$.2SiO$_2$) is increased, so that the heat resistance is readily reduced.

In the case where the aluminum concentration in the spinning solution is less than 170 g/L or where the concentration of the organic polymer is less than 20 g/L, the spinning solution does not have an appropriate viscosity, thus reducing the fiber diameter of the resulting alumina/silica-based fibers. That is, an excessively large amount of free water in the spinning solution results in a low drying rate during the spinning by the blowing method, leading to excessive extension. As a result, the diameter of the spun precursor fibers is changed, failing to provide short fibers having a predetermined average fiber diameter and a sharp fiber diameter distribution. Furthermore, in the case where the aluminum concentration is less than 170 g/L, the productivity is reduced. Meanwhile, in the case where the aluminum concentration exceeds 210 g/L or where the concentration of the organic polymer exceeds 50 g/L, in either case, the viscosity is so high that the solution cannot be used as a spinning solution. The aluminum concentration in the spinning solution is preferably in the range of 180 to 200 g/L. The concentration of the organic polymer is preferably in the range of 30 to 40 g/L.

The spinning solution described above is prepared by adding the silicon compound and the organic polymer to an aqueous solution of basic aluminum chloride in amounts to satisfy the foregoing ratio of Al$_2$O$_3$ to SiO$_2$, and then concentrating the resulting mixture in such a manner that the aluminum concentration and the concentration of the organic polymer fall within the ranges described above.

<Spinning>

Spinning (the formation of fibers from the spinning solution) is usually performed by a blowing method in which a spinning solution is fed into a high-velocity spinning gas flow, thereby producing short-fiber alumina precursor. The structure of a spinning nozzle used in the spinning described above is not particularly limited. For example, as described in Japanese Patent No. 2602460, preferred is a structure in which an airflow emerging from an air nozzle and the flow of a spinning solution emerging from a spinning solution supply nozzle are parallel to each other and in which the parallel flow of air is sufficiently rectified and comes into contact with the spinning solution.

With respect to spinning, preferably, fibers sufficiently drawn from the spinning solution are formed under conditions in which the evaporation of water and the decomposition of the spinning solution are prevented, and then the resulting fibers are rapidly dried. To this end, the atmosphere is preferably changed from a state in which the evaporation of water is suppressed to a state in which the evaporation of water is promoted, in the course from the formation of the fibers from the spinning solution to the arrival of the fibers at a fiber collecting device.

The aggregate of the alumina/silica-based fiber precursor can be recovered in the form of a continuous sheet (thin-layer sheet) with an accumulating device having a structure in which a wire-mesh endless belt is arranged so as to be substantially perpendicular to the spinning airflow and in which the spinning airflow containing the alumina/silica-based fiber precursor impinges on the belt while the endless belt is rotated.

The thin-layer sheet recovered by the accumulating device is continuously unwind and fed to a folding device. The thin-layer sheet is folded to a predetermined width and stacked. Simultaneously, the folded sheet is continuously transferred in a direction perpendicular to a folding direction to form a laminated sheet. This arrangement of the thin-layer sheet results in the laminated sheet having a uniform weight per unit area across the entire sheet. As the foregoing folding device, a device described in Japanese Unexamined Patent Application Publication No. 2000-80547 may be used.

{Needling Treatment Step}

The mat-like aggregate of the alumina/silica-based fiber precursor produced by spinning is then subjected to needling treatment. In the present invention, the needling treatment is performed under conditions in which the foregoing needling density is satisfied and at least one, preferably two or more, and more preferably all of (1) the $N_A/N_B$ ratio, (2) the width of the fiber bundles, and (3) the needle mark are satisfied.

{Firing Step}

Firing after the needling treatment is usually performed at 900° C. or higher and preferably 1000° C. to 1300° C. A firing temperature of less than 900° C. leads to insufficient crystallization, thus providing only brittle alumina/silica-based fibers having low strength. A firing temperature exceeding 1300° C. leads to the progress of grain growth of the fibers, thereby providing only brittle alumina/silica-based fibers having low strength.

[Mat]

The mat of the present invention includes the inorganic fiber formed article of the present invention.

Examples of applications of the mat of the present invention include, but are not particularly limited to, various heat insulators and packing. In particular, the mat is useful as a mat for an exhaust gas cleaning device.

Preferably, the mat, such as the mat for an exhaust gas cleaning device, does not contain an organic binder. In the case where the mat contains an organic binder, the mat preferably has an organic polymer content of less than 2% by weight.

When the organic binder content of the mat is 2% by weight or more, the formation of decomposition gases, such as $NO_x$, CO, and HC, by the decomposition of the organic binder due to the high temperature of an exhaust gas at the time of engine combustion becomes problematic, which is not preferred.

For the inorganic fiber formed article of the present invention, even if the organic binder is not used, the amount of dust emission can be suppressed to a low level, as described above. Thus, the inorganic fiber formed article is useful as a mat for exhaust gas cleaning, in which the mat does not contain an organic binder or contains a very small amount of an organic binder.

The mat of the present invention is preferably formed of the inorganic fiber formed article that does not contain an organic binder. In the case where an organic binder is used, examples of the organic binder that can be used include various rubbers, water-soluble polymers, thermoplastic resins, and thermosetting resins.

Aqueous solutions, water-dispersible emulsions, latexes, and organic solvent solutions, each of which contains the foregoing organic binder serving as an active component, are commercially available. These organic binder liquids can be used as it is or diluted with, for example, water before use. Thus they can be suitably used to incorporate the organic binder into the mat. The organic binder contained in the mat may not necessarily be a single type and may be a mixture of two or more types.

Among the foregoing organic binders, preferred are synthetic rubbers, such as acrylic rubbers and nitrile rubbers; water-soluble polymers, such as carboxymethyl cellulose and polyvinyl alcohols; and acrylic resins. Among these compounds, particularly preferred are acrylic rubbers, nitrile rubbers, carboxymethyl cellulose, polyvinyl alcohols, and acrylic resins that are not included in acrylic rubbers. These binders can be preferably used because the organic binder liquids are easily prepared or available, an impregnation operation of the mat is easily performed, a sufficient binding force is exerted even at a relatively low binder content, the resulting formed article is flexible with excellent strength, and the organic binders are easily decomposed or eliminated under operating temperature conditions.

In the case where the mat of the present invention contains the organic binder, the organic binder content is preferably less than 2% by weight and particularly preferably 1.5% by weight or less.

[Exhaust Gas Cleaning Device]

The exhaust gas cleaning device of the present invention includes a catalyst-supporting member, a casing that covers the outside of the catalyst-supporting member, and a mat arranged between the catalyst-supporting member and the casing. As the mat, the mat of the present invention is used. The mat has high peel strength and a smooth surface and reveals only a small amount of dust emission. Thus, the mat has excellent handleability and workability in assembling the exhaust gas cleaning device, and has the ability to satisfactorily hold the catalyst-supporting member after the assembly, thereby resulting in excellent exhaust gas cleaning efficiency.

The configuration of the exhaust gas cleaning device is not particularly limited. The present invention can be applied to a typical exhaust gas cleaning device including a catalyst-supporting member, a casing, and a mat for holding the catalyst-supporting member.

EXAMPLES

While the present invention will be described more specifically below by examples and comparative examples, the present invention is not limited to these examples as long as it does not depart from the gist thereof.

Measurement and evaluation methods of various physical properties and characteristics of the resulting inorganic fiber formed article are described below.

<Peel Strength>

A 50 mm×50 mm square test specimen is cut out from a raw fabric. A cut having a depth of 5 mm is made in the middle of the thickness of an end face of the test specimen. Both ends formed by the cut are held by jigs and mounted on a tensile testing machine. The average load (N) is measured when the test specimen is pulled in opposite directions at a speed of 50 mm/min into two pieces.

<Amount of Dust Emission>

A test specimen having a width of 50 mm and a length of 450 mm (area: 225 cm$^2$) was cut out from the raw fabric. The specimen was wound around a polyvinyl chloride pipe having a diameter of 50 mm at a normal load of 1 kg. Immediately after the completion of the winding, the weight of dust scattered from the test specimen was measured. The amount of dust emission was calculated from an expression described below.

The winding of the test specimen around the pipe was performed in a plastic bag. After the completion of the winding, the pipe around which the test specimen was wound was taken out from the plastic bag. The dust in the plastic bag was recovered and weighed. The resulting weight was defined as a dust weight.

Amount of dust emission wt %=weight of recovered dust (g)/weight of test specimen (g)×100

<Peak-to-Valley Height Difference>

A test specimen having a width of 50 mm and a length of 200 mm was cut out from the raw fabric. To fix the shape of a surface, an alumina sol (Alumina sol-200, manufactured by Nissan Chemical Industries. Ltd.) was sprayed over the surface and dried at 105° C. for 5 hours. The resulting specimen was fixed on a surface plate. A roller-type probe equipped with a pen having a diameter of 10 mm was placed on an end and transferred in the longitudinal direction of the test specimen so as to trace irregularities on the surface of the test specimen. The vertical movement of the probe was recorded as irregularities. The maximum width of the recorded locus of the probe was defined as a peak-to-valley height difference on the same surface.

The peak-to-valley height difference on the same surface was determined by performing the measurement for both surfaces of the test specimen.

The peak-to-valley height difference between front and back surfaces was determined as follows: The maximum peak-to-valley height difference on the back surface was measured in the same way. A value obtained by subtracting the maximum peak-to-valley height difference on the back surface from the maximum peak-to-valley height difference on the front surface was defined as the peak-to-valley height difference between front and back surfaces.

<$N_A/N_B$ Ratio>

Sections in the longitudinal and transverse directions of the raw fabric were sampled at intervals of 3 mm for each section. On the basis of a magnified image seen through an optical stereoscopic microscope, the number of visible fiber bundles extending in the thickness direction of each section was counted. Upon letting the number of the fiber bundles present in a region with a width W of 2 cm (20 mm) of section A along the longitudinal direction be $N_A$, and letting the number of the fiber bundles present in a region with a width W of 2 cm of section B along the transverse direction be $N_B$, the $N_A/N_B$ ratio was calculated. The numbers of the fiber bundles were counted in three portions for each section. The average values thereof were defined as $N_A$ and $N_B$.

<Width of Fiber Bundle>

When the $N_A/N_B$ ratio was measured, widths (each of which was the width of the widest portion) of 10 fiber bundles exposed on section A along the longitudinal direction were measured and averaged.

<Needle Mark>

A 3-mm-thick surface layer of the raw fabric was peeled. To a magnified image seen through an optical microscope, 3 mm×3 mm square cells (12 cells for each of the longitudinal and transverse directions, 144 cells in total) were allocated. The presence or absence of a needle mark was checked for each cell.

<Canning Test>

A test specimen having the shape of a catalyst-holding material (mat) with a width of 114 mm and a length of 340 mm was punched out from the raw fabric. The specimen was wound around a monolith having a diameter of 102 mm. A fitting portion was taped. A resistance load (press-fitting load) when the specimen-wound monolith was press-fitted into a stainless steel cylindrical tube having an inside diameter of 110 mm was measured. Furthermore, a resistance load (pull-out load) when the specimen-wound monolith was pull out from the opposite direction after the press-fitting was measured. The appearance of the mat after the pulling out was observed to check the presence or absence of an abnormality. In this case, the weight per unit area (g/cm$^2$) of the mat was adjusted in such a manner that the bulk density (g/cm$^3$) was in the range of 0.39 to 0.41 when the mat was arranged in a gap (cm) between the monolith and the stainless steel cylindrical tube.

Examples 1 to 5 and Comparative Examples 1 to 3

A silica sol was added to an aqueous solution of basic aluminum chloride (aluminum content: 70 g/L, Al/Cl=1.8 (atomic ratio)) in such a manner that an ultimately obtained alumina fiber composition satisfied $Al_2O_3:SiO_2$=72:28 (ratio by weight). After a polyvinyl alcohol was added thereto, the mixture was concentrated to prepare a spinning solution having a viscosity of 40 poise and an alumina-silica content of about 30% by weight. Fibers were spun from the spinning solution by a blowing method. The resulting fibers were collected to form a mat-like aggregate of an alumina/silica-based fiber precursor. The mat-like aggregate was subjected to needle punching at a needling density described in Table 1 and then fired at 1200° C. to form a long mat-like crystalline alumina/silica-based fiber formed article (fired fibers) (hereinafter, also referred to as a "raw fabric") having a width of 600 mm, a thickness described in Table 1, and a surface density described in Table 1.

The composition ratio of the resulting crystalline alumina/silica-based fibers was alumina/silica=72/28 (ratio by weight). The average fiber diameter (average value of 100 fibers) of the crystalline alumina/silica-based fibers was measured by the observation of the mat-like aggregate with a microscope and found to be 5.5 μm.

Raw fabrics produced in examples were subjected to various evaluations. Tables 1 and 2 illustrate the results.

In Comparative Example 3, the resulting raw fabric was impregnated with an acrylic resin latex, serving as an organic binder, to form a resin-impregnated sheet having an acrylic resin content of 4% by weight in the form of a solid.

TABLE 1

|  | Needling density (punches/cm$^2$) | Surface density (g/cm$^2$) | Thickness (mm) | $N_A/N_B$ ratio | Width of fiber bundle (mm) | Needle mark *2 |
|---|---|---|---|---|---|---|
| Example 1 | 100 | 1400 | 7.3 | 0.3 | 0.21 | 144/144 |
| Example 2 | 80 | 1400 | 7.5 | 0.39 | 0.24 | 144/144 |
| Example 3 | 120 | 1400 | 6.9 | 0.2 | 0.25 | 144/144 |
| Example 4 | 80 | 1200 | 7.6 | 0.39 | 0.2 | 144/144 |
| Example 5 | 60 | 1200 | 7.7 | 0.45 | 0.22 | 144/144 |
| Comparative Example 1 | 16 | 1400 | 8.8 | 0.83 | 0.41 | 129/144 |
| Comparative Example 2 | 16 | 1200 | 8.5 | 1 | 0.45 | 125/144 |
| Comparative | 5 | 1200 | 6.4 | 1 | 0.57 | 116/144 |

TABLE 1-continued

| | Needling density (punches/cm$^2$) | Surface density (g/cm$^2$) | Thickness (mm) | $N_A/N_B$ ratio | Width of fiber bundle (mm) | Needle mark *2 |
|---|---|---|---|---|---|---|
| Example 3 *1 | | | | | | |

*1: Impregnation with organic binder
*2: Number of cells where needle marks are present/total number of cells

TABLE 2

| | Peel strength (N) | Amount of dust emission (wt %) | Peak-to-valley height difference (mm) | | | Canning test | | |
|---|---|---|---|---|---|---|---|---|
| | | | In-plane | | Front and back surfaces | Press-fitting load (kgf) | Pull-out load (kgf) | Appearance after pulling out |
| | | | Front surface | Back surface | | | | |
| Example 1 | 9.5 | 0.06 | 0.6 | 0.1 | 0.5 | 320 | 290 | No problem |
| Example 2 | 7.1 | 0.05 | 0.7 | 0.1 | 0.6 | 347 | 303 | No problem |
| Example 3 | 10.2 | 0.09 | 0.6 | 0.2 | 0.4 | 435 | 385 | No problem |
| Example 4 | 7.5 | 0.07 | 0.7 | 0.2 | 0.5 | 340 | 315 | No problem |
| Example 5 | 6.5 | 0.05 | 0.8 | 0.2 | 0.6 | 330 | 295 | No problem |
| Comparative Example 1 | 3.2 | 0.16 | 1.2 | 0.1 | 1.1 | 330 | 290 | Partial displacement of surface layer |
| Comparative Example 2 | 3.8 | 0.14 | 1.4 | 0.2 | 1.2 | 313 | 278 | Partial displacement of surface layer |
| Comparative Example 3 | 5 | 0.03 | 0.9 | 0.1 | 0.8 | 342 | 303 | Partial displacement of surface layer |

Tables 1 and 2 demonstrate that the present invention provides the mat for exhaust gas cleaning, in which the mat has excellent handleability and workability because the mat is easily fitted the metal casing and reveals only a small amount of dust emission owing to its high peel strength and excellent surface smoothness.

While the present invention has been described by the specific embodiments, it will be obvious to those skilled in the art that various changes may be made without departing from the intention and scope of the invention.

This application is based on Japanese Patent Application No. 2009-255114 filed Nov. 6, 2009, which is hereby incorporated by reference herein in its entirety.

The invention claimed is:

1. An inorganic fiber formed article comprising a mat-like aggregate of inorganic fibers,
   wherein the article is obtained by a needling treatment wherein a needling density per unit area of a surface of a mat exceeds 50 punches/cm$^2$, and
   wherein the article satisfies all three requirements selected from the group consisting of requirement i), requirement ii), and requirement iii) as follows:
   i) a ratio of a number $N_A$ of fiber bundles extending in a thickness direction and located in a region with a predetermined width W of section A in a predetermined direction to a number $N_B$ of fiber bundles extending in the thickness direction and located in a region with a predetermined width W of section B in a direction orthogonal to the predetermined direction, $N_A/N_B$, is 0.5 or less;
   ii) a width of each of the fiber bundles observed in sections A and B in the thickness direction is 0.3 mm or less; and
   iii) a needle mark is present in any 3 mm×3 mm region on the surface of the mat.

2. The article of claim 1, having a peel strength of 5 N or more.

3. The article of claim 1, wherein an amount of dust emission is 0.1% by weight or less.

4. The article of claim 1, having a smoothness wherein a first peak-to-valley height difference on a single surface of the mat, and a second peak-to-valley height difference between a front and back surface of the mat, are each 1 mm or less.

5. The article of claim 1, wherein the inorganic fibers comprise alumina and silica.

6. The article of claim 1,
   wherein the article is obtained by subjecting a mat-like aggregate of an inorganic fiber precursor to the needling treatment to obtain a needled aggregate, and then firing the needled aggregate, and
   wherein the inorganic fiber precursor is obtained by a sol-gel method.

7. The article of claim 1, wherein W is 20 mm.

8. The article of claim 1, wherein the needling density is 50 to 250 punches/cm$^2$.

9. A mat comprising the article of claim 1.

10. The mat of claim 9, comprising less than 2% by weight of an organic binder.

11. The mat of claim 9, comprising no organic binder.

12. The mat of claim 9, suitable for use in an exhaust gas cleaning device.

13. An exhaust gas cleaning device comprising a catalyst-supporting member, a casing that covers an outside of the catalyst-supporting member, and the mat of claim 9, wherein the mat is arranged between the catalyst-supporting member and the casing.

14. The article of claim 1, wherein the inorganic fibers comprise alumina and silica in crystalline form.

15. The article of claim 1, wherein the inorganic fibers comprise alumina and silica in a weight ratio range of 60:40 to 95:5.

16. The article of claim 1, wherein the inorganic fibers comprise alumina and silica in a weight ratio range of 70:30 to 74:26.

17. The article of claim 1, wherein the inorganic fibers have an average fiber diameter of 3 to 8 μm.

\* \* \* \* \*